US009690941B2

(12) United States Patent
Thom et al.

(10) Patent No.: US 9,690,941 B2
(45) Date of Patent: Jun. 27, 2017

(54) POLICY BOUND KEY CREATION AND RE-WRAP SERVICE

(75) Inventors: Stefan Thom, Snohomish, WA (US); Robert Karl Spiger, Seattle, WA (US); Valerie Kathleen Bays, Redmond, WA (US); Bo Gustaf Magnus Nyström, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 13/109,685

(22) Filed: May 17, 2011

(65) Prior Publication Data

US 2012/0297200 A1    Nov. 22, 2012

(51) Int. Cl.
  *G06F 21/57*    (2013.01)
  *G06F 21/62*    (2013.01)
  *G06F 21/60*    (2013.01)

(52) U.S. Cl.
  CPC ............ *G06F 21/57* (2013.01); *G06F 21/602* (2013.01); *G06F 21/6209* (2013.01); *H04L 2209/127* (2013.01)

(58) Field of Classification Search
  CPC ............... G06F 21/602; G06F 21/6209; H04L 2209/127
  USPC ........................................................ 713/189
  See application file for complete search history.

(56) References Cited

U.S. PATENT DOCUMENTS

| 7,099,477 | B2 * | 8/2006 | Bade ...................... G06F 21/57 380/279 |
| 7,319,759 | B1 * | 1/2008 | Peinado ................ H04L 9/0825 380/277 |
| 7,412,596 | B2 | 8/2008 | Challener et al. |
| 7,506,380 | B2 * | 3/2009 | Hunter ................... G06F 21/575 713/1 |
| 7,558,564 | B2 | 7/2009 | Wesby |
| 7,587,607 | B2 | 9/2009 | Brickell et al. |
| 7,711,960 | B2 * | 5/2010 | Scarlata ................ H04L 9/0897 713/155 |
| 8,090,939 | B2 * | 1/2012 | Ali .......................... G06F 21/34 713/156 |

(Continued)

OTHER PUBLICATIONS

Trusted Platform Module TPM Fundamental; Raymond Ng; Infineon; APTISS, Aug. 8, 2008.*

(Continued)

*Primary Examiner* — James Turchen
(74) *Attorney, Agent, or Firm* — Fiala & Weaver P.L.L.C.

(57) ABSTRACT

One or more techniques and/or systems are provided for provisioning encrypted key blobs and client certificates. That is, a trusted execution environment on a first machine may provide a key service provider with a cryptographic encryption key. The key service provider may encrypt a key blob using the cryptographic encryption key and/or wrap the encrypted key blob with one or more policies, such as a platform policy. The key service provider may provision the encrypted key blob to a client on the first machine. The client may submit the encrypted key blob to the trusted execution environment for validation so that the client may perform key actions, such as sign an email or encrypt data. Because the key blob may be specific to a particular trusted execution environment and/or machine, the key service provider may re-wrap the key blob if the client "roams" to a second machine.

20 Claims, 10 Drawing Sheets

(56) References Cited

U.S. PATENT DOCUMENTS

| | | | | |
|---|---|---|---|---|
| 8,190,916 | B1* | 5/2012 | Wang | G06F 21/575 |
| | | | | 713/193 |
| 8,259,948 | B2* | 9/2012 | Smith | G06F 21/57 |
| | | | | 380/277 |
| 8,510,573 | B2* | 8/2013 | Muller | G06F 21/6209 |
| | | | | 711/162 |
| 8,539,587 | B2* | 9/2013 | Proudler | G06F 21/57 |
| | | | | 713/164 |
| 8,549,592 | B2* | 10/2013 | Bade | G06F 21/57 |
| | | | | 713/100 |
| 8,555,072 | B2* | 10/2013 | Camenisch | G06F 21/445 |
| | | | | 380/30 |
| 8,667,265 | B1* | 3/2014 | Hamlet | H04L 9/0866 |
| | | | | 326/80 |
| 8,887,144 | B1* | 11/2014 | Marr | G06F 8/65 |
| | | | | 713/2 |
| 2003/0133575 | A1* | 7/2003 | Challener | G06F 21/62 |
| | | | | 380/277 |
| 2003/0182286 | A1* | 9/2003 | Seccuro | G06F 17/30861 |
| 2005/0060568 | A1* | 3/2005 | Beresnevichiene | G06F 21/10 |
| | | | | 726/26 |
| 2006/0265598 | A1* | 11/2006 | Plaquin | H04L 63/0892 |
| | | | | 713/182 |
| 2007/0001827 | A1 | 1/2007 | Asbjornsen et al. | |
| 2007/0006213 | A1* | 1/2007 | Shahidzadeh | G06F 21/57 |
| | | | | 717/171 |
| 2007/0143632 | A1* | 6/2007 | Matsuzaki | G06F 21/6218 |
| | | | | 713/193 |
| 2007/0226505 | A1* | 9/2007 | Brickell | G06F 21/57 |
| | | | | 713/176 |
| 2008/0059799 | A1* | 3/2008 | Scarlata | H04L 9/0897 |
| | | | | 713/176 |
| 2008/0229106 | A1* | 9/2008 | Nishiguchi | G06F 21/57 |
| | | | | 713/171 |
| 2008/0235793 | A1* | 9/2008 | Schunter | G06F 12/145 |
| | | | | 726/22 |
| 2008/0270781 | A1* | 10/2008 | Ibrahim | G06F 21/57 |
| | | | | 713/2 |
| 2009/0055655 | A1* | 2/2009 | Ziv | G06F 12/1466 |
| | | | | 713/184 |
| 2009/0070573 | A1 | 3/2009 | Ebringer et al. | |
| 2009/0204964 | A1* | 8/2009 | Foley | G06F 21/53 |
| | | | | 718/1 |
| 2009/0210456 | A1* | 8/2009 | Subramaniam | G06F 21/57 |
| 2010/0023782 | A1* | 1/2010 | Prakash | G06F 21/6218 |
| | | | | 713/193 |
| 2010/0042992 | A1 | 2/2010 | Vasilevsky et al. | |
| 2010/0064133 | A1* | 3/2010 | Martin | H04L 63/0209 |
| | | | | 713/154 |
| 2010/0070800 | A1* | 3/2010 | Hanna | G06F 21/575 |
| | | | | 714/6.12 |
| 2010/0082991 | A1 | 4/2010 | Baldwin et al. | |
| 2010/0088523 | A1* | 4/2010 | Wooten | G06F 21/57 |
| | | | | 713/189 |
| 2010/0159911 | A1 | 6/2010 | Childs et al. | |
| 2010/0202617 | A1* | 8/2010 | Balakrishnan | G06F 21/575 |
| | | | | 380/277 |
| 2010/0250936 | A1* | 9/2010 | Kusakawa | H04L 9/3278 |
| | | | | 713/169 |
| 2011/0093693 | A1* | 4/2011 | Ibrahim | G06F 21/57 |
| | | | | 713/2 |
| 2013/0042321 | A1* | 2/2013 | Wang | G06F 21/445 |
| | | | | 726/22 |
| 2013/0061056 | A1* | 3/2013 | Proudler | G06F 21/57 |
| | | | | 713/176 |
| 2014/0108786 | A1* | 4/2014 | Kreft | G06F 21/71 |
| | | | | 713/156 |

OTHER PUBLICATIONS

Secure Data Management in Trusted Computing; Ulrich Kuhn et al.; Deutsche Telekom Laboratories; CHES 2005, LNCS 3659, pp. 324-338, 2005.*
Overview of the TPM Key Management Standard; Thomas Hardjono et al.; 2008.*
Property-Based TPM Virtualization; Ahmad-Reza Sadeghi et al.; ISC 2008, LNCS 5222, pp. 1-16, 2008.*
Measured Boot Model; Jon Millen et al.; MITRE; Nov. 2007.*
Exercise 6: TPM Key Management and Key Replication Mechanisms; Ruhr-University Bochum; Chair for System Security; SS 2009.*
Sandhu, et al., "Peer-to-Peer Access Control Architecture Using Trusted Computing Technology", Retrieved at <<http://profsandhu.com/it862/it862s05/TC-body2-acmformat.pdf>>, 10th ACM Symposium on Access Control Models and Technologies, Jun. 1-3, 2005, pp. 12.
Stumpf, et al., "A Robust Integrity Reporting Protocol for Remote Attestation", Retrieved at <<http://www.sec.in.turn.de/assets/staff/stumpf/robustIRPRE.pdf>>, Second Workshop on Advances in Trusted Computing (WATC), 2006, pp. 1-12.
"TCG EFI Platform Specification"; Version 1.20 Final Revision 1.0 7 Jun. 2006 for TPM Family 1.1 or 1.2; http://www.trustedcomputinggroup.org/files/temp/644EE853-1D09-3519-ADB133C09A5F2BDF/TCG%20EFI%20Platform%20Specification.pdf.

* cited by examiner

POLICY BOUND KEY CREATION AND RE-WRAP SERVICE

BACKGROUND

Trusted execution environments, such as a trusted platform module (TPM), are commonly used to enhance security of computing platforms. For example, a trusted execution environment may be implemented as a separate piece of hardware that may be integrated into a computing platform machine (e.g., trusted platform module integrated into a PC). The trusted execution environment may allow for confidential and secure creation of keys, which may be used by a client to perform secure key actions, such as signing an email, encrypting data, logging onto a machine, etc. In particular, the client may submit a key to a platform module to perform a secure key action through the trusted execution environment. When creating keys, the trusted execution environment may bind keys to one or more policies, such as a platform policy. A platform policy may limit the use of a key to machines having a particular platform configuration (e.g., a platform boot state, a hardware configuration, a software configuration, etc.). In one example, a trusted execution environment may provide a client with an email signing key that may be wrapped with a platform policy. The use of the email signing key may be limited to machines having a similar platform configuration as the platform policy. Thus, if the configuration of the client's machine changes and/or the client attempts to use the email signing key to sign emails on a different machine, then the key may be rejected.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for provisioning an encrypted key blob and a client certificate are disclosed herein. In particular, a client on a first machine may request a key blob and a client certificate from a key service provider (e.g., a centralized security server). The key service provider may encrypt a key blob using a cryptographic encryption key associated with a trusted execution environment (e.g., a storage root public key created by a trusted platform module) on the first machine to create an encrypted key blob. The cryptographic encryption key may correspond to a cryptographic decryption key held secret by the trusted execution environment (e.g., accessible merely to the trusted execution environment). In this way, the encrypted key blob may be limited to use on the trusted execution environment that holds the cryptographic decryption key because the encrypted key blob cannot be decrypted without the corresponding cryptographic decryption key. It may be appreciated that the client may be unable to access and/or tamper with the encrypted key blob because the client may not have access to the cryptographic decryption key on the trusted execution environment.

It will be appreciated that, as used herein, cryptographic encryption key, cryptographic decryption key, etc. and/or the like may broadly refer to a wide variety of (e.g., any one or more) cryptographic keys (e.g., cryptographic keys associated with a trusted platform module). For example, a cryptographic encryption key and/or a cryptographic decryption key (e.g., storage root public key and/or storage root private key) may correspond to one or more symmetric cryptographic keys (e.g., via key derivation function (KDF)) and/or other cryptographic keys supported by one or more trusted execution environments (e.g., a trusted platform module).

The key service provider may wrap the encrypted key blob with one or more policies. In one example, the encrypted key blob may be wrapped with a platform policy corresponding to a platform boot state of the first machine. In this way, the key blob may be limited to a use on machines having a similar platform boot state as the first machine (e.g., the key blob may be rejected on a second machine having a different software and/or hardware configuration, the key blob may be rejected on the first machine if malware has affected the boot state of the first machine, etc.). In another example, the encrypted key blob may be wrapped with a user password policy. In another example, the encrypted key blob may be wrapped with a key usage number policy, which may limit the number of times the encrypted key blob may be used. In another example, the encrypted key blob may be wrapped with a time window policy, which may limit the usage of the encrypted key blob to a predetermined time frame.

It will be appreciated that, as used herein, wrap, wrapped, wrapping, etc. and/or the like may broadly refer to a wide variety of binding techniques (e.g. that may bind an encrypted key blob with a policy). That is, wrapping is intended to comprise one or more binding techniques and not merely wrapping specifically. For example, an encrypted key blob may be wrapped (e.g., or bound) with a policy by cryptographically binding the encrypted key blob with the policy.

The encrypted key blob and the client certificate may be provisioned to the client on the first machine. The client may submit the encrypted key blob to the trusted execution environment on the first machine to perform key actions (e.g., encrypt data, sign an email document, protect a software product, log onto a machine, etc.). In particular, the trusted execution environment may validate the encrypted key blob using the cryptographic decryption key corresponding to the cryptographic encryption key that was used by the key service provider to encrypt the key blob. However, if the cryptographic decryption key does not match the cryptographic encryption key used to encrypt the encrypted key blob, then the validation may fail (e.g., the client submits the encrypted key blob to a second trusted platform on a second machine that does not have access to the corresponding cryptographic decryption key). If the encrypted key blob is validated, then the trusted execution environment may allow the user to perform a key action, such as signing an email. The client may provide the client certificate to third parties so that the third parties may validate the key action performed by the client using the trusted execution environment. In particular, third parties may determine from the certificate that the client would merely have been able to use the private key if it was operating under the specified policy (because otherwise the private key could not have been unwrapped). For example, the client may provide the client certificate to a recipient of a signed email so that the recipient may validate the signature using the client certificate.

It may be appreciated that the trusted execution environment on the first machine may be able to validate (e.g., decrypt) the encrypted key blob with the cryptographic decryption key kept secret by the trusted execution environment. However, other trusted execution environments may not be able to validate the encrypted key blob because the other trusted execution environments do not have access to the cryptographic decryption key kept secret by the trusted execution environment (e.g., a second trusted execution environment may not have access to the cryptographic decryption key of a first trusted execution environment that can decrypt the encrypted key blob). For example, the cryptographic decryption key may be unique and/or secret to the trusted execution environment. It follows that the client may be unable to perform key actions using the encrypted key blob at other machines because such machines do not comprise the trusted execution environment with the corresponding cryptographic decryption key. Additionally, trusted execution environments may be unique, for example. In one example, if a client attempts to submit the encrypted key blob to a second trusted execution environment on a second machine, then the second trusted execution environment may not validate the encrypted key blob because the second trusted execution environment may not comprise the cryptographic decryption key corresponding to the cryptographic encryption key that was used to encrypt the encrypted key blob.

Accordingly, as provided herein, when a user moves to a second machine having a second trusted execution environment, the key service provider may create a re-wrapped encrypted key blob using a second cryptographic encryption key corresponding to the second trusted execution environment. That is, the key service provider may re-wrap the encrypted key blob by encrypting the key blob with the second cryptographic encryption key. The second trusted execution environment may be able to decrypt (validate) the re-wrapped encrypted key blob using a corresponding second cryptographic decryption key kept secret by the second trusted execution environment. If a platform policy, for example, was wrapped into the encrypted key blob, then the key service provider may wrap a second platform policy conforming to a second platform boot state of the second machine into the re-wrapped encrypted key blob. The client may submit the re-wrapped key blob to the second trusted execution environment to perform a second key action. The client may perform the second key action based upon the second trusted execution environment validating the re-wrapped encrypted key blob with the second cryptographic decryption key and/or validating the second platform boot state of the second machine with the second platform policy. In this way, the key service provider may provision encrypted key blobs and/or re-wrap encrypted key blobs so that the user is not bound to a particular trusted execution environment on a particular machine when performing key actions.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
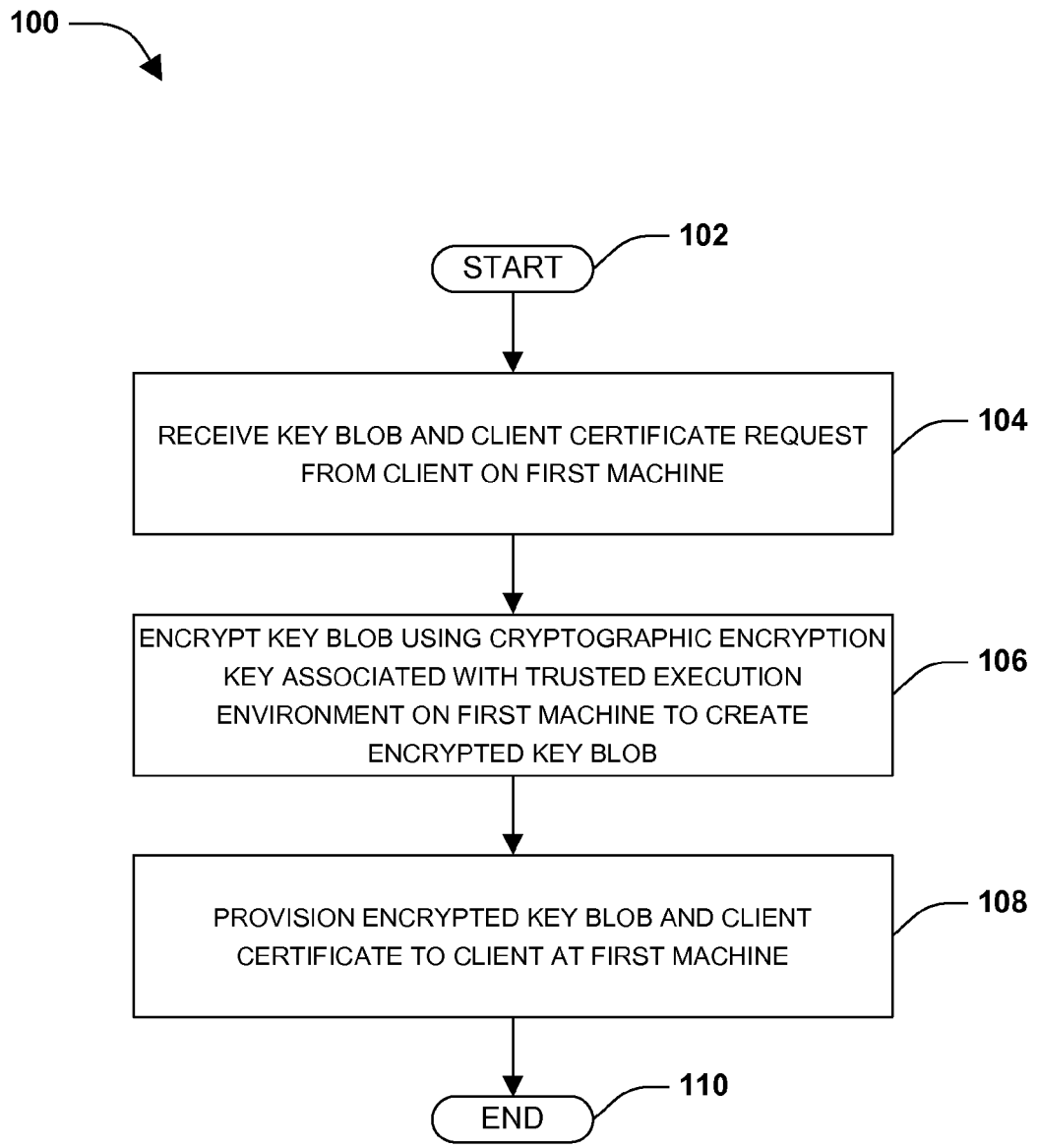
FIG. 1 is a flow chart illustrating an exemplary method of provisioning an encrypted key blob and a client certificate.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Trusted execution environment, such as trusted platform modules, may be incorporated into machines, such as desktops, smart phones, and laptops, as additional hardware to provide for confidential and secure creation of client keys. Client keys may allow a client to perform key actions, such as sign documents, encrypt files, secure software products, log onto machines, and/or perform a plethora of security related actions. Trusted execution environments may be configured to bind a client key's use to particular policies. In one example, a client may be able to utilize a client key if the client provides a password corresponding to a password policy. In another example, the client may be able to utilize a client key if the client is using the client key on a machine having a particular platform configuration (e.g., a platform boot state of the machine) corresponding to a platform policy. If the client complies with such policies, then the client may submit the client key to the trusted execution environment for validation to perform key actions through the trusted execution environment. In another example of a usage policy, a client key may expire after a predetermined number of uses and/or after a determined passage of time.

The trusted execution environment may secure the client key by encrypting the client key using a storage root key pair (e.g., a cryptographic encryption key may be used to encrypt the client key, while a cryptographic decryption key kept secret to the trusted execution environment may be used to decrypt the client key). To perform a key action, the client may submit the client key to the trusted execution environment. The trusted execution environment may validate the client key by decrypting the client key with the cryptographic decryption key. Once validated, the client may perform a key action, such as signing an email, through the trusted execution environment. Unfortunately, the client may be unable to utilize the client key on other machines because such machines may not comprise trusted execution environments with access to the cryptographic decryption key of the trusted execution environment that encrypted the client key (e.g., the cryptographic decryption key may be unique and/or kept secret by the trusted execution environment that created the client key). Thus, a second trusted execution environment on a second machine may be unable to validate the client key because the second trusted execution environment may not have access to the corresponding cryptographic decryption key. Additionally, a platform policy may be wrapped into the client key, which may restrict use of the client key to machines that conform to a particular platform boot state (e.g., a hardware configuration, a software configuration, etc.). Thus, if the client attempts to utilize the client key on a second machine, the client key may not be validated because the second machine may not conform to the platform policy. In this way, the client may be restricted to using a client key on a particular machine comprising a particular trusted execution environment.

Accordingly, as provided herein a key service provider may be configured to provision a key blob encrypted with a cryptographic encryption key corresponding to a cryptographic decryption key of a trusted execution environment (e.g., a storage root public key corresponding to a storage root public key of a trusted platform module may be used to encrypt a key blob). Additionally, the key service provider may wrap the encrypted key blob with policies, such as a platform policy and/or a password policy. In this way, a client may submit the encrypted key blob to the trusted execution environment to perform a key action, such as signing an email or encrypting data. If the client roams to a second machine comprising a second trusted execution environment, then the key service provider may re-wrap the encrypted key blob by encrypting the key blob with a second cryptographic encryption key associated with the second trusted execution environment on the second machine. Additionally, the key service provider may re-wrap the encrypted key blob with a platform policy corresponding to the second machine. In this way, the client may utilize the re-wrapped encrypted key blob on the second machine.

The key service provider may be configured to provision a client certificate to the client. The client certificate may be relied upon by third parties to establish trust in the trusted execution environment. That is, the client certificate may implicitly provide assertions that the trusted execution environment is trusted and/or provide attestation statements associated with the trusted execution environment. If one or more policies are wrapped into an encrypted key blob associated with a client certificate, then the client certificate may prove to third parties that the client is in accordance with such policies, because otherwise the client may be unable to access a private key associated with the encrypted key blob to perform a key action in the absence of complying with such polices. In one example, the client certificate may indicate client usage compliance. That is, the client certificate may indicate the circumstances under which the client may utilize the encrypted key blob to perform key actions.

It may be appreciated that encrypted key blobs and/or client certificates may be pre-generated. That is, a pre-generated encrypted key blob and/or client certificate may be provisioned to a requesting client. It may be appreciated that in one example, an encrypted key blob and/or client certificate may expire after a predetermined number of uses and/or after a predetermined passage of time.

One embodiment of provisioning an encrypted key blob and a client certificate is illustrated by an exemplary method 100 in FIG. 1. At 102, the method starts. At 104, a key blob and client certificate request may optionally be received from a client on a first machine (e.g., merely a cryptographic encryption key as discussed infra may be needed and thus such a key blob and/or client certificate request may not be received). For example, a key service provider may receive the key blob and client certificate request. It may be appreciated that the key service provider may comprise a cryptographic encryption key associated with a trusted execution environment on the first machine. In particular, the key service provider may have received an endorsement key certificate associated with the trusted execution environment. The endorsement key certificate may prove that the trusted execution environment may be trusted (e.g., the endorsement key certificate may be burned, etched, etc. into the trusted execution environment to prove that a particular manufacturer made the trusted execution environment). The key service provider may provide an encrypted ownership request to the trusted execution environment. The encrypted ownership request may be encrypted using the endorsement key certificate. The trusted execution environment may create a cryptographic key pair (e.g., a storage root key pairing). The trusted execution environment may keep secret a cryptographic decryption key, and may provide a cryptographic encryption key to the key service provider. In this way, the key service provider may take ownership of the trusted execution environment. In one example, the key service provider may encrypt key blobs using the cryptographic encryption key. In another example, the key service provider may perform ownership commands, such as reset a lockout of the trusted execution environment due to a client failing to provide a correct user password.

At 106, a key blob may be encrypted using the cryptographic encryption key associated with the trusted execution environment on the first machine to create an encrypted key blob. It may be appreciated that the encrypted key blob may be securely encrypted so that the encrypted key blob may be inaccessible without the corresponding cryptographic decryption key, which may be kept secret by the trusted execution environment. The encrypted key blob may be wrapped with one or more polices. In one example of wrapping the encrypted key blob, the encrypted key blob may be wrapped with a platform policy corroding to a platform boot state of the first machine. In particular, if the platform boot state of the first machine indicates that the first machine is in a valid state, then the encrypted key blob may be wrapped with the platform policy corresponding to the platform boot state of the first machine. For example, platform configuration registers associated with the first machine may be evaluated to determine that a hardware configuration, a software configuration, code executed during boot up of the first machine, and/or other state information indicates that the first machine has not been compromised (e.g., the first machine does not comprise malware). In this way, a platform policy may be wrapped into the encrypted key blob. The platform policy may limit the use of the encrypted key blob to machines comprising a platform boot state conforming to the platform policy. In another example of wrapping the encrypted key blob, a password policy associated with the client may be wrapped into the encrypted key blob. The password policy may limit the use of the encrypted key blob to a client that can provide the corresponding user password.

At 108, the encrypted key blob and the client certificate may be provided to the client at the first machine. In this way, the client may submit the encrypted key blob to the trusted platform on the first machine to perform key actions (e.g., sign an email, encrypt data, etc.). For example, the client may submit the encrypted key blob to the trusted execution environment, and the trusted execution environment may validate the encrypted key blob by decrypting the encrypted key blob with the cryptographic decryption key. It may be appreciated that the client may be unable to use the encrypted key blob to perform key actions on a different machine because the different machine does not comprise the trusted execution environment of the first machine that has access to the cryptographic decryption key. Additionally, the client may be unable to use the encrypted key blob if a machine used by the client to perform the key action does not comply with a platform policy.

If the client is unable to use the encrypted key blob, then the client may request that the encrypted key blob be re-wrapped. Accordingly, a request to re-wrap the encrypted key blob may be received. In one example of re-wrapping the encrypted key blob, the request to re-wrap the encrypted key blob may be based upon a new platform boot state of the first machine (e.g., hardware and/or software of the first machine may have been upgraded). Upon determining that the new platform boot state is in a valid state (e.g., not compromised), the encrypted key blob may be re-wrapped with a new platform policy corresponding to the new platform boot state of the first machine to create a re-wrapped encrypted key blob. If the new platform boot state indicates that the first machine is not in a valid state, then the re-wrap request may be refused. The re-wrapped encrypted key blob may be provided to the client at the first machine. In this way, the client may submit the re-wrapped encrypted key blob to the trusted execution environment on the first machine. The re-wrapped encrypted key blob may be validated based at least in part upon the new platform boot state of the first machine complying with the new platform policy.

In another example of re-wrapping the encrypted key blob, the request to the re-wrap the encrypted key blob may be based upon a second trusted execution environment of a second machine. That is, the client may have "roamed" to a second machine comprising a second trusted execution environment, and may desire to use the encrypted key blob on the second machine to perform a key action. However, the second trusted execution environment of the second machine may be unable to validate the encrypted key blob because the second platform module may not have access to the corresponding cryptographic decryption key that is kept secret by the trusted execution environment of the first machine. Thus, upon determining that a second platform boot state indicates that the second machine is in a valid state, the key blob may be encrypted with a second cryptographic encryption key associated with the second trusted execution environment on the second machine to create a re-wrapped encrypted key blob. Additionally, if the encrypted key blob was associated with a platform boot state of the first machine, then a second platform policy corresponding to the second platform boot state of the second machine may be wrapped into the re-wrapped encrypted key blob (e.g., the second platform policy corresponding to the second machine may replace the platform policy corresponding to the first machine). The re-wrapped encrypted key blob may be provisioned to the client at the second machine.

In another example of re-wrapping the encrypted key blob, the request to re-wrap the encrypted key blob may be based upon a new password of the client. Upon validating the new password, the encrypted key blob may be re-wrapped with the new password. The re-wrapped encrypted key blob may be provisioned to the client. It may be appreciated that the encrypted key blob may be re-wrapped based upon a variety of different conditions and/or policies, which may allow a client to perform key actions on various machines, and thus the examples provided herein are not meant to be interpreted in a limiting manner. At 110, the method ends.

Figure 2:
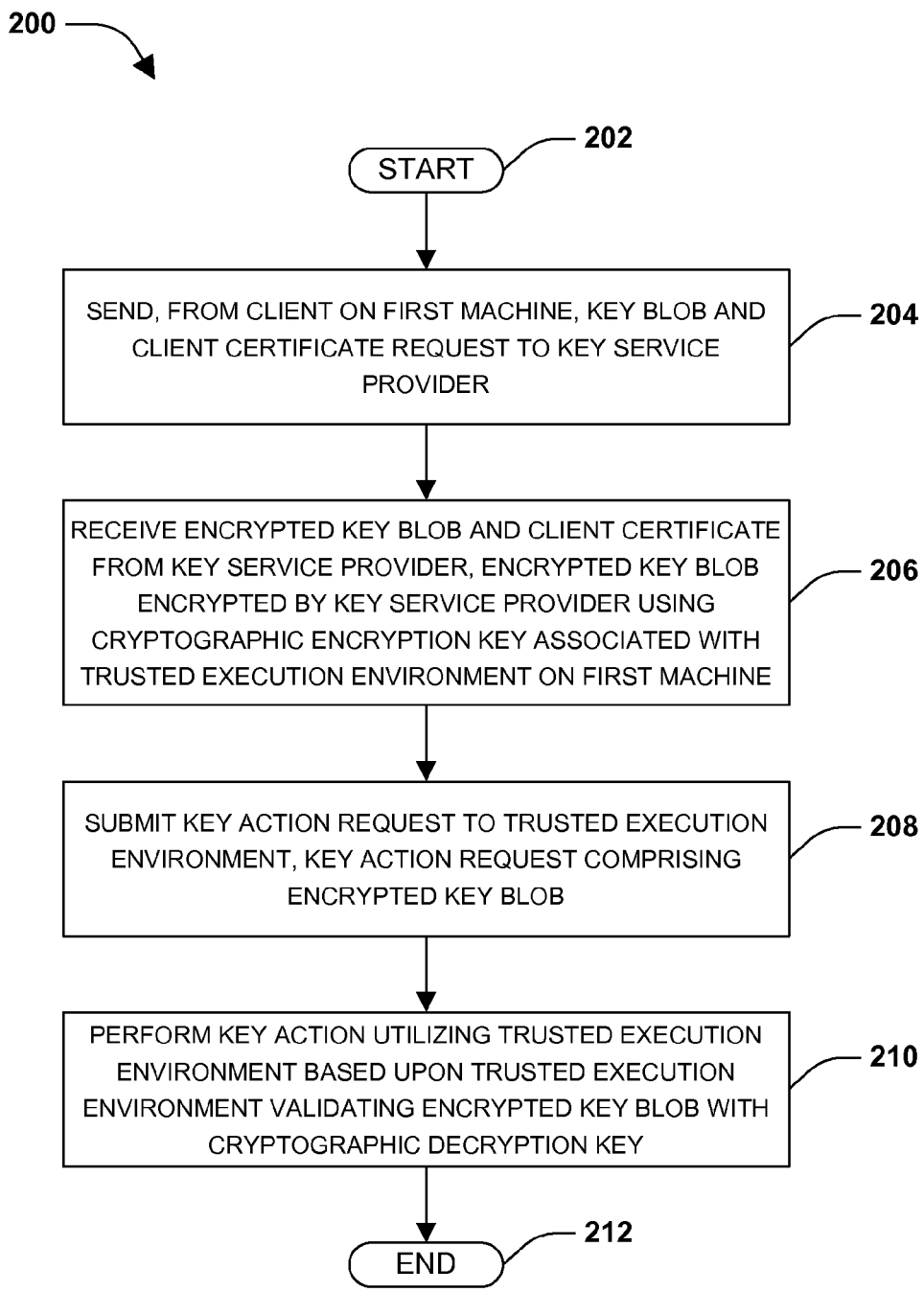
FIG. 2 is a flow chart illustrating an exemplary method of obtaining an encrypted key blob and a client certificate.

One embodiment of obtaining an encrypted key blob and a client certificate is illustrated by exemplary method 200 in FIG. 2. At 202, the method starts. At 204, a client on a first machine may optionally send a key blob and client certificate request to a key service provider. For example, the client may desire to perform a key action through a trusted execution environment on the first machine using the key blob, which may be verified by third parties using the client certificate. (Such a request may not be required, however, and is thus optional.) At 206, the encrypted key blob and the client certificate may be received from the key service provider. The encrypted key blob may be encrypted by the key service provider using a cryptographic encryption key associated with the trusted execution environment on the first machine. It may be appreciated that the encrypted key blob may be wrapped with one or more policies, such as a platform policy and/or a password policy.

At 208, a key action request may be submitted to the trusted execution environment on the first machine. The key action request may correspond to a key action that the client may desire to perform through the trusted execution environment. The key action request may comprise the encrypted key blob. If the encrypted key blob is wrapped with a platform policy, then the key action request may comprise a current platform boot state of the first machine. If the encrypted key blob is wrapped with a password policy, then the key action request may comprise a user password.

At 210, the key action may be performed utilizing the trusted execution environment based upon the trusted execution environment validating the encrypted key blob with a cryptographic decryption key associated with the trusted execution environment. The cryptographic decryption key may be a private key that corresponds to the cryptographic encryption key that was used by the key service provider to encrypt the encrypted key blob (e.g., the cryptographic decryption key may be capable of decrypting the encrypted key blob). If the encrypted key blob is wrapped with a platform policy, then the trusted execution environment may validate the current platform boot state of the first machine with the platform policy before performing the key action. If the encrypted key blob is wrapped with a password policy, then the trusted execution environment may validate the user password with the password policy before performing the key action. In one example, the key action may be performed to sign an object, such as an email, with a client signature. The signed object and the client certificate may be provided to a recipient for validation. The recipient may validate the client signature of the signed object using the client certificate.

It may be appreciated that the client may "roam" to a second machine comprising a second trusted platform, and may desire to perform a key action using the encrypted key blob. However, the second trusted platform may not validate the encrypted key blob because the second trusted platform does not have access to the cryptographic decryption key associated with the cryptographic encryption key that was used to encrypt the encrypted key blob. Additionally, if a platform policy associated with a platform boot state of the first machine was wrapped into the encrypted key blob, then the second machine may fail to comply with the platform policy. Accordingly, the client on the second machine may send a request to the key service provider to re-wrap the encrypted key blob based upon a second trusted execution environment of the second machine. A re-wrapped encrypted key blob may be received from the key service provider. The re-wrapped encrypted key blob may be encrypted with a second cryptographic encryption key associated with the second trusted execution environment of the second machine, and may be wrapped with a second platform policy corresponding to the second platform boot state of the second machine, for example.

The client may submit a second key action request to the second trusted platform. The second key action request may comprise the re-wrapped encrypted key blob and a second current platform boot state of the second machine. A second key action may be performed utilizing the second trusted execution environment based upon the second trusted execution environment validating the re-wrapped encrypted key blob with a second cryptographic decryption key and/or validating the second current platform boot state with the second platform policy. In this way, the client may perform key actions on the second machine. At 212, the method ends.

Figure 3:
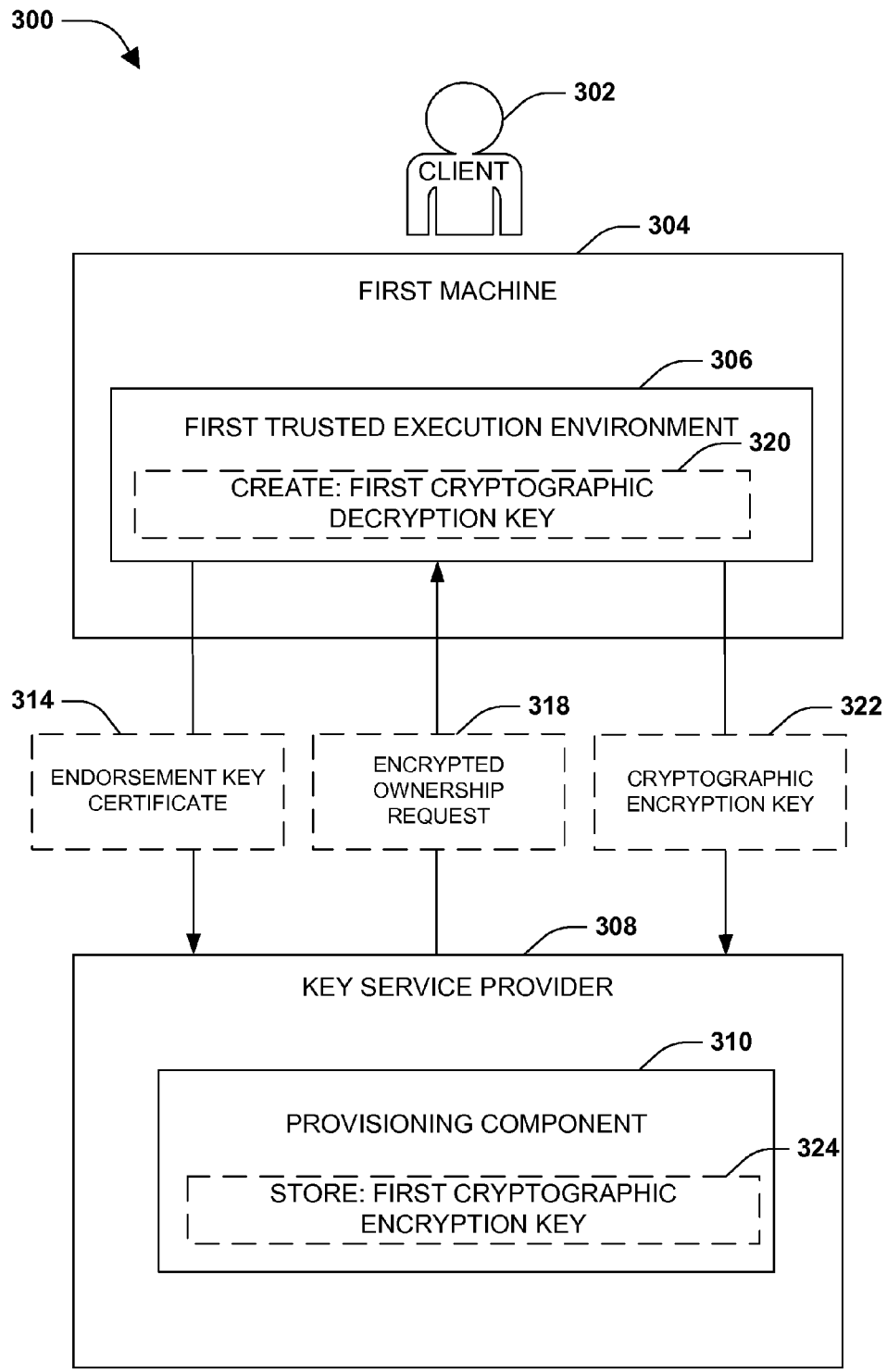
FIG. 3 is an illustration of an example of a key service provider taking ownership of a first trusted execution environment on a first machine.

FIG. 3 illustrates an example 300 of a key service provider 308 taking ownership of a first trusted execution environment 306 on a first machine 304. The first machine 304 (e.g., a desktop, a laptop, a smart phone, and/or any other general computing device of the client 302) may comprise the first trusted execution environment 306. For example, the first trusted execution environment 306 may be implemented as additional hardware within the first machine 304. The first trusted execution environment 306 may comprise an endorsement key certificate 314 that may prove that the first trusted execution environment 306 may be trusted (e.g., the endorsement key certificate 314 may prove that a particular manufacturer made the first trusted execution environment 306). That is, the endorsement key certificate 314 (and/or possession of a private key) may prove to external parties to demonstrate the trusted execution environment's trustworthiness. It may be appreciated that one or more endorsement key certificates (e.g., an OEM platform certificate, an enterprise asset certificate, a trusted platform manufacturer's certificate, etc.) may be associated with an endorsement key that may have been issued by various entities. The first trusted execution environment 306 may allow entities, such as the key service provider 308, to take ownership of the first trusted execution environment 306. In this way, an owner may perform ownership operations.

In one example, the endorsement key certificate 314 may be provided to the key service provider 308 to prove that the first trusted execution environment 306 may be trusted. The key service provider 308 may request to take ownership by providing an encrypted ownership request 318 to the first trusted execution environment 306. The encrypted ownership request 318 may be encrypted using the endorsement key certificate 314. The first trusted execution environment 306 may create a storage root key pair comprising a first cryptographic decryption key 320 kept secret by the first trusted execution environment 306 and a first cryptographic encryption key 322 that may be provided to the key service provider 308. The key service provider 308 may comprise a provisioning component 310 that may store 324 and/or use the first cryptographic encryption key 322 to create encrypted key blobs.

It may be appreciated that the key service provider 308 may provision encrypted key blobs to clients without taking ownership of trusted execution environments, such as trusted execution environment 306. However, taking ownership of a trusted execution environment may increase a level of trust the key service provider 308 has in the trusted execution environment.

Figure 4:
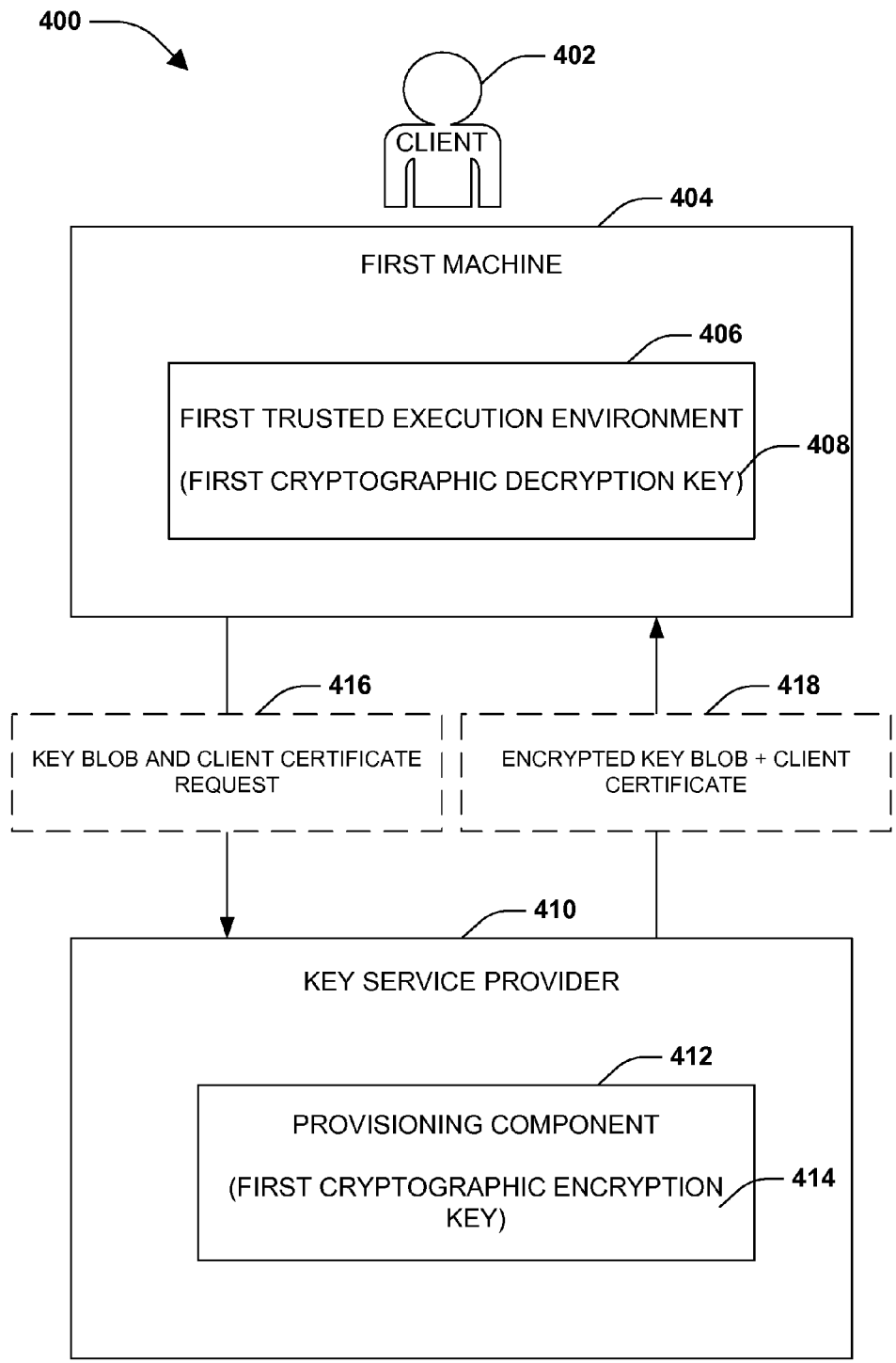
FIG. 4 is a component block diagram illustrating an exemplary system for provisioning encrypted key blobs and/or client certificates.

FIG. 4 illustrates an example of a system 400 configured to provision encrypted key blobs and/or client certificates. The system 400 may comprise a provisioning component 412. For example, the provisioning component 412 may be associated with a key service provider 410. The provisioning component 412 may be configured to optionally receive a key blob and client certificate request 416 from a client 402 on a first machine 404 (e.g., such a request may not be required, and the provisioning component thus need not necessarily be configured to handle the same). It may be appreciated that the first machine 404 may comprise a first trusted execution environment 406. The first trusted execution environment 406 may have created a first cryptographic decryption key 408 and a first cryptographic encryption key 414. The first trusted execution environment 406 may keep the first cryptographic decryption key 408 secret, while providing the first cryptographic encryption key 414 to the provisioning component 412 for the encryption of key blobs.

Upon receiving the key blob and client certificate request 416, the provisioning component 412 may encrypt a key blob using the cryptographic encryption key 414 associated with the first trusted execution environment 406 on the first machine 404 to create an encrypted key blob. The provisioning component may wrap the encrypted key blob with one or more policies, such as a platform policy corresponding to a platform boot state of the first machine 404. The provisioning component 412 may provision 418 the encrypted key blob and/or the client certificate to the client 402 on the first machine 404. In this way, the client 402 may submit the encrypted key blob to the first trusted execution environment 406 for validation to perform key actions.

Figure 5:
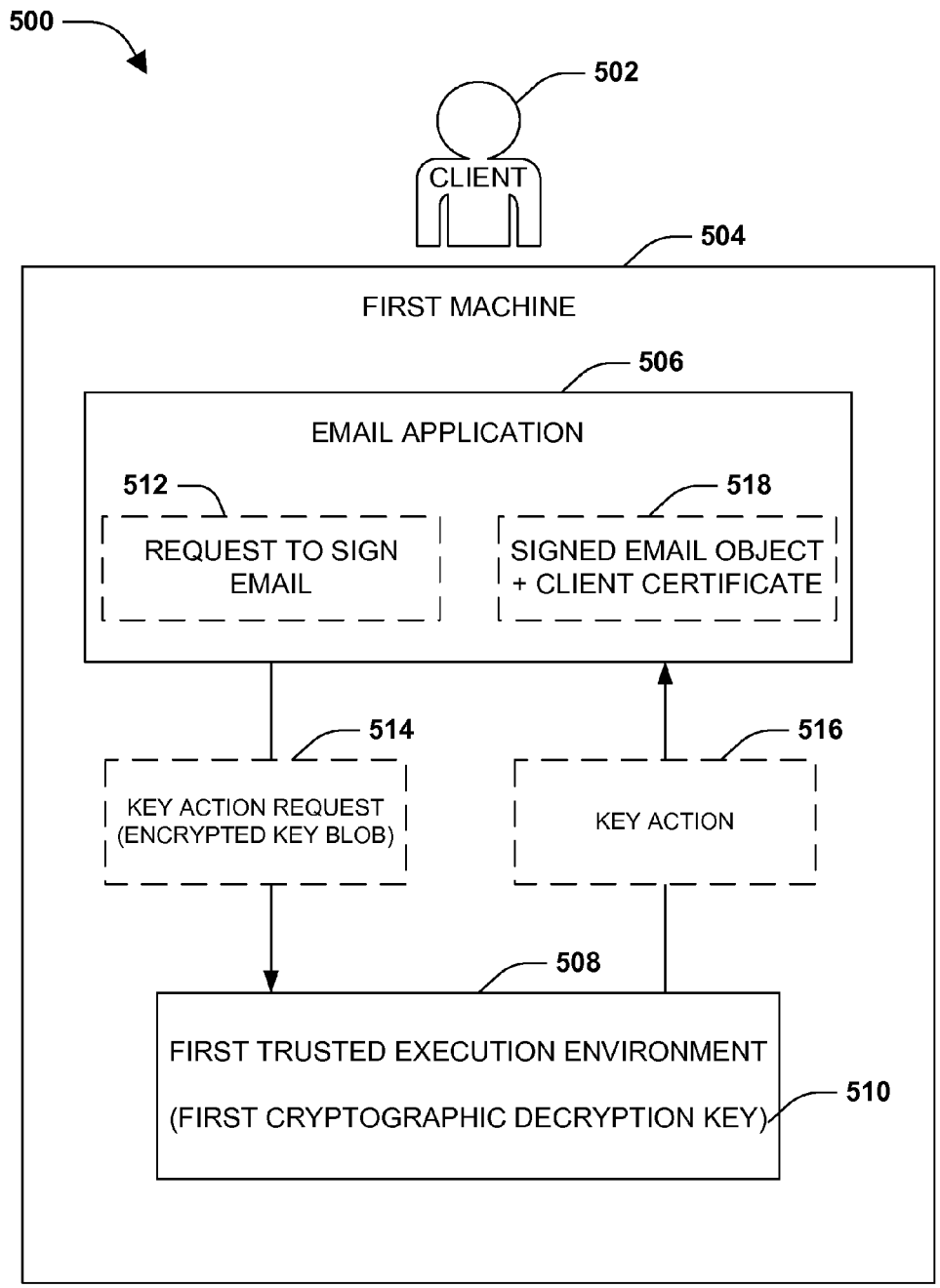
FIG. 5 is an illustration of an example of a client invoking a first trusted execution environment to perform a key action on a first machine based upon the first trusted execution environment validating an encrypted key blob.

FIG. 5 illustrates an example 500 of a client 502 invoking a first trusted execution environment 508 to perform a key action 516 on a first machine 504 based upon the first trusted execution environment 508 validating an encrypted key blob. The client 502 may interact with an email application 506 on the first machine 504. For example, the client 502 may desire to send a secure email to a recipient. In this way, the client 502 may request 512 to sign an email by submitting a key action request 514 comprising the encrypted key blob to the first trusted execution environment 508. The first trusted execution environment 508 may validate the encrypted key blob using a first cryptographic decryption key 510. If the encrypted key blob is wrapped with one or more policies, then the first trusted execution environment 508 may determine whether the client 502 and/or the first machine 504 comply with such policies. If the encrypted key blob is validated, then the first trusted execution environment 508 may perform the key action 516 so that the client 502 may sign 518 the email object. The email application 506 may attach the client certificate to the signed email object so that a recipient of the signed email object may validate the signature using the client certificate.

Figure 6:
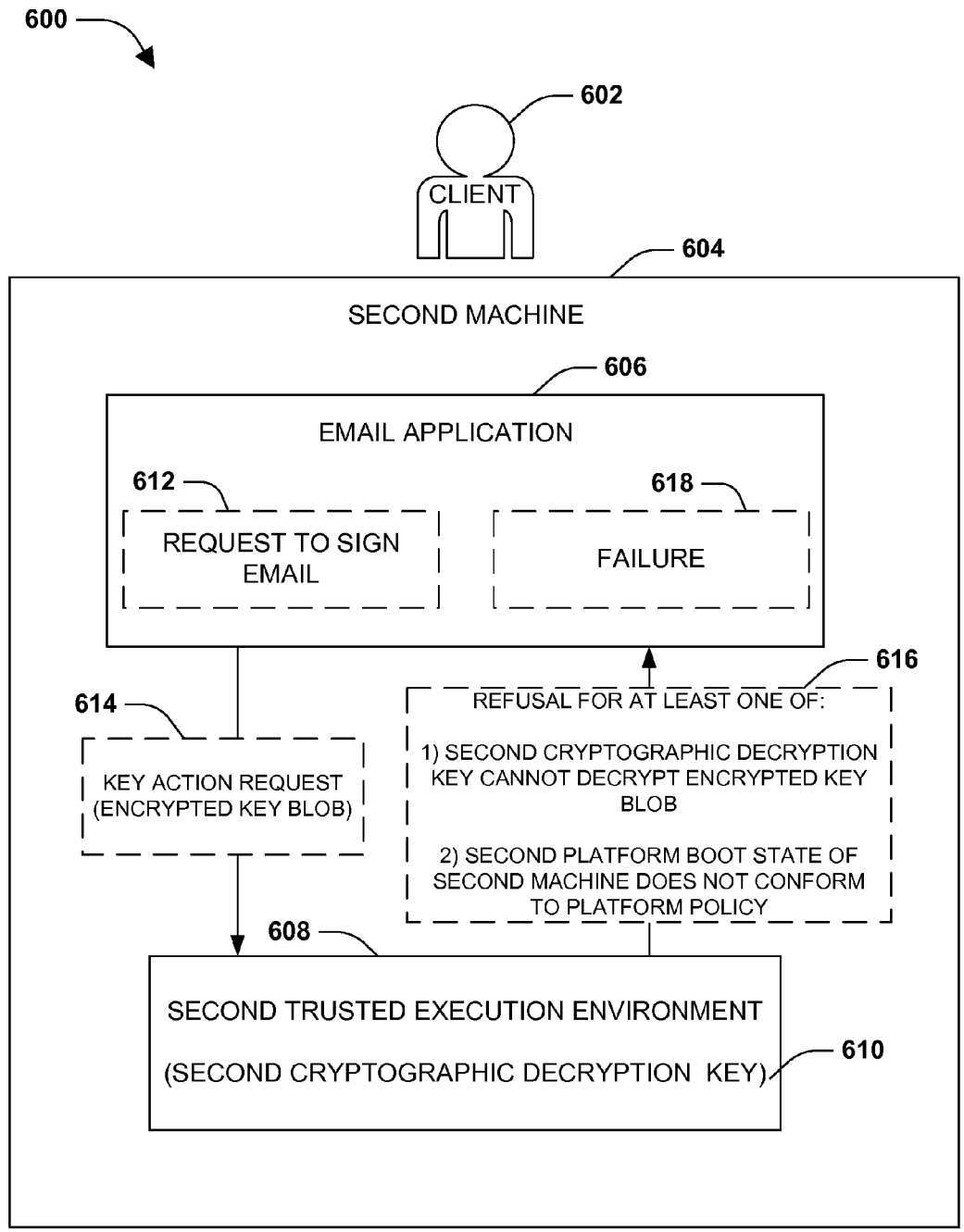
FIG. 6 is an illustration of an example of a second trusted execution environment on a second machine refusing to perform a key action.

FIG. 6 illustrates an example 600 of a second trusted execution environment 608 on a second machine 604 refusing 616 to perform a key action. A client 602 may have been provisioned an encrypted key blob while using a first machine comprising a first trusted execution environment. A key service provider may have encrypted the key blob with a first cryptographic encryption key associated with the first trusted platform. Additionally, the key service provider may have wrapped with encrypted key blob with a platform policy corresponding to a first platform boot state of the first machine.

The client 602 may attempt to use the key blob at the second machine 604. For example, the client 602 may utilize an email application 606 on the second machine 604 to send a secure email to a recipient. In this way, the client 602 may request 612 to sign an email by submitting a key action request 614 comprising the encrypted key blob to the second trusted execution environment 608. If the encrypted key blob is wrapped with a platform policy, then the key action request may comprise a current platform boot state of the second machine 604. The second trusted execution environment 608 may attempt to validate the encrypted key blob using the second cryptographic decryption key 610. However, the validation may fail because the second cryptographic decryption key 610 may not correspond to the first cryptographic encryption key that was used to encrypt the key blob. Additionally, the validation may fail because the current platform boot state of the second machine 604 may not comply with the platform policy wrapped into the encrypted key blob (e.g., the encrypted key blob may be wrapped with a platform policy corresponding to a platform boot state of a first machine). The second trusted execution environment 608 may refuse 616 to perform the key action, and thus the request to sign the email may fail 618.

Figure 7:
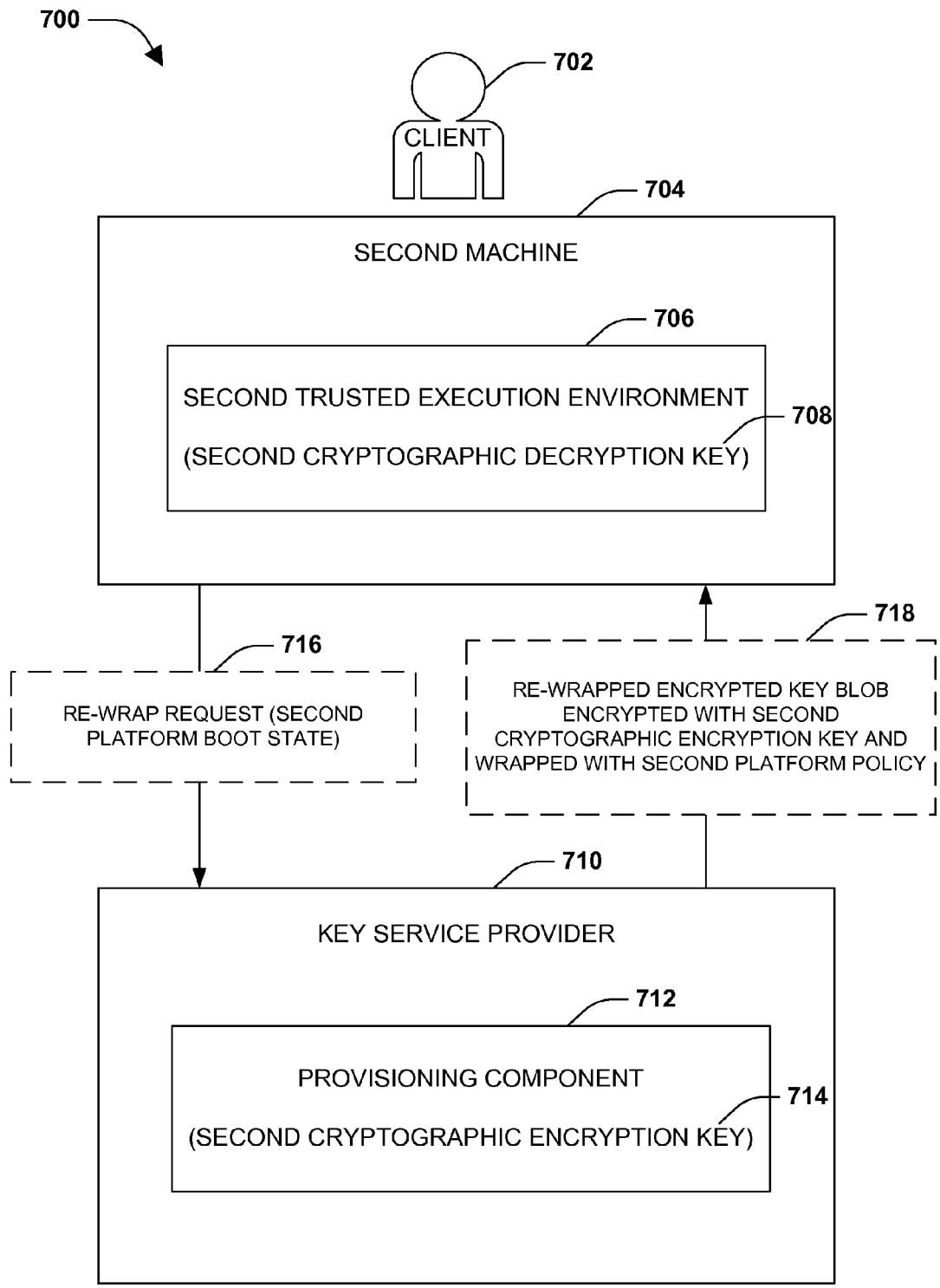
FIG. 7 is an illustration of an example of a key service provider re-wrapping an encrypted key blob.

FIG. 7 illustrates an example 700 of a key service provider 710 re-wrapping an encrypted key blob. A client 702 may have been provisioned an encrypted key blob while using a first machine comprising a first trusted execution environment. A key service provider may have encrypted the key blob with a first cryptographic encryption key associated with the first trusted platform. Additionally, the key service provider may have wrapped with encrypted key blob with a platform policy corresponding to a first platform boot state of the first machine.

The client 702 may attempt to use the key blob to perform a key action at a second machine 704 comprising a second trusted execution environment 706. In one example, the second trusted execution environment 706 may refuse to perform the key action because the second trusted execution environment 706 may be unable to validate the encrypted key blob using a second cryptographic decryption key 708 (e.g., the encrypted key blob may have been encrypted with a first cryptographic encryption key that may not correspond to the second cryptographic decryption key 708). In another example, the second trusted execution environment 706 may also refuse to perform the key action because the second trusted execution environment 706 may be unable to validate a current platform boot state of the second machine 704 with a platform policy wrapped into the encrypted key blob (e.g., the encrypted key blob may have been wrapped with a platform policy corresponding to a first machine, but not the second machine 704). Thus, the client 702 may send a re-wrap request 716 to a provisioning component 712 on a key service provider 710. If the encrypted key blob is wrapped with a platform policy, then the re-wrap request 716 may comprise a second platform boot state of the second machine 704.

The provisioning component 712 may have access to a second cryptographic encryption key 714 associated with the second cryptographic decryption key 708 kept secret by the second trusted execution environment 706 on the second machine 704 (e.g., by requesting the same from the second trusted platform 706). If the provisioning component 712 determines that the second platform boot state indicates that the second machine is in a valid state, then the provisioning component 712 may encrypt the key blob with the second cryptographic encryption key 714 (e.g., the encryption with the second cryptographic encryption key 714 may replace the prior encryption with the first cryptographic encryption key). If the encrypted key blob was wrapped with a platform policy, then the provisioning component 712 may wrap the re-wrapped encrypted key blob with a second platform policy corresponding to the second platform boot state of the second machine 704. In this way, the re-wrapped encrypted key blob 718 may be provided to the client 702 on the second machine 704 so that the client 702 may perform key actions by submitting the re-wrapped encrypted key blob to the second trusted execution environment 706 for validation.

Figure 8:
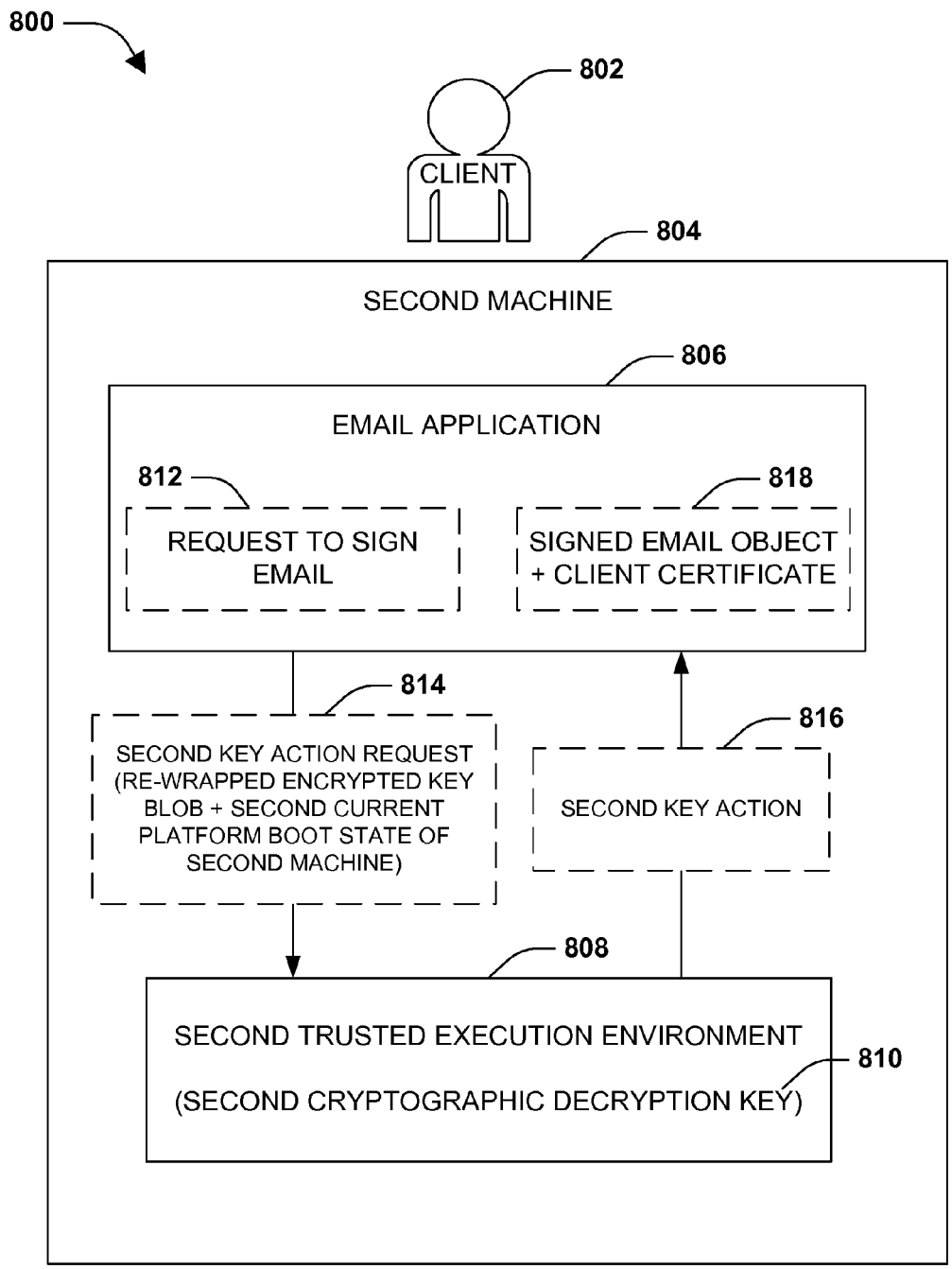
FIG. 8 is an illustration of an example of a client invoking a second platform module to perform a second key action on a second machine based upon the second trusted execution environment validating a re-wrapped encrypted key blob.

FIG. 8 illustrates an example 800 of a client 802 invoking a second platform module 808 to perform a second key action 816 on a second machine 804 based upon the second trusted execution environment 808 validating a re-wrapped encrypted key blob. The client 802 may have been provisioned a re-wrapped encrypted key blob from a key service provider. The re-wrapped encrypted key blob may have been encrypted with a second cryptographic encryption key corresponding to a second cryptographic decryption key 810 kept secret by the second trusted execution environment 808. The re-wrapped encrypted key blob may have been wrapped with a second platform policy corresponding to a second platform boot state of the second machine 804.

The client 802 may attempt to use the re-wrapped encrypted key blob to perform a key action at the second machine 802. For example, the client 802 may desire to send a secure email using an email application 806 on the second machine 804. In this way, the client 802 may request 812 to sign an email by sending a second key action request 814 to the second trusted execution environment 808. The second key action request 814 may comprise the re-wrapped encrypted key blob and/or a second current platform boot state of the second machine 804. The second trusted execution environment 808 may validate the re-wrapped encrypted key blob using the second cryptographic decryption key 810. If the re-wrapped encrypted key blob is wrapped with a second platform policy, then the second trusted execution environment 808 may validate the second current platform boot state with the second platform policy. In this way, the second trusted execution environment 808 may perform the second key action 816 so that the client 802 may sign 818 the email object.

Figure 9:
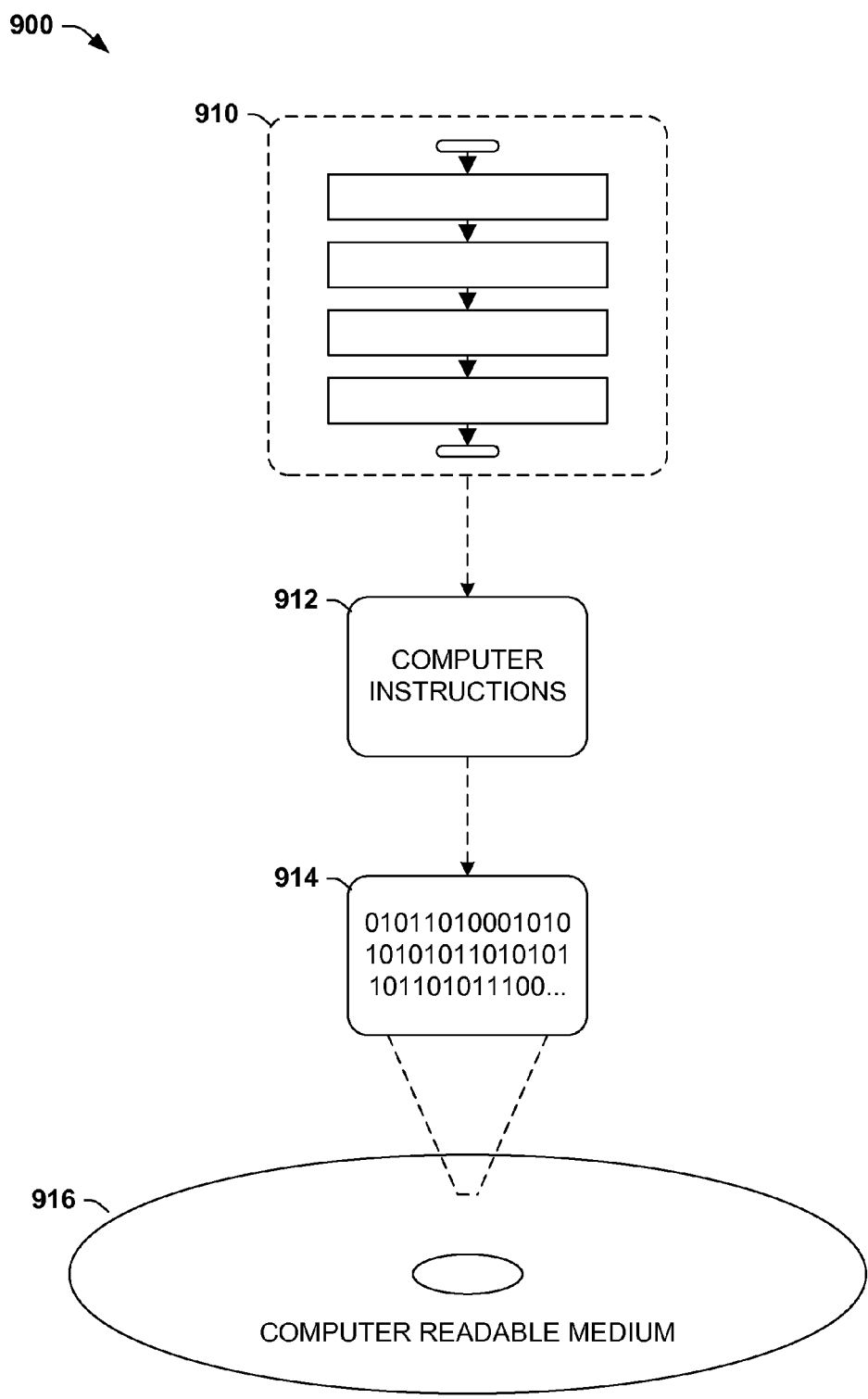
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as the exemplary method 100 of FIG. 1 and/or exemplary method 200 of FIG. 2, for example. In another such embodiment, the processor-executable instructions 912 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
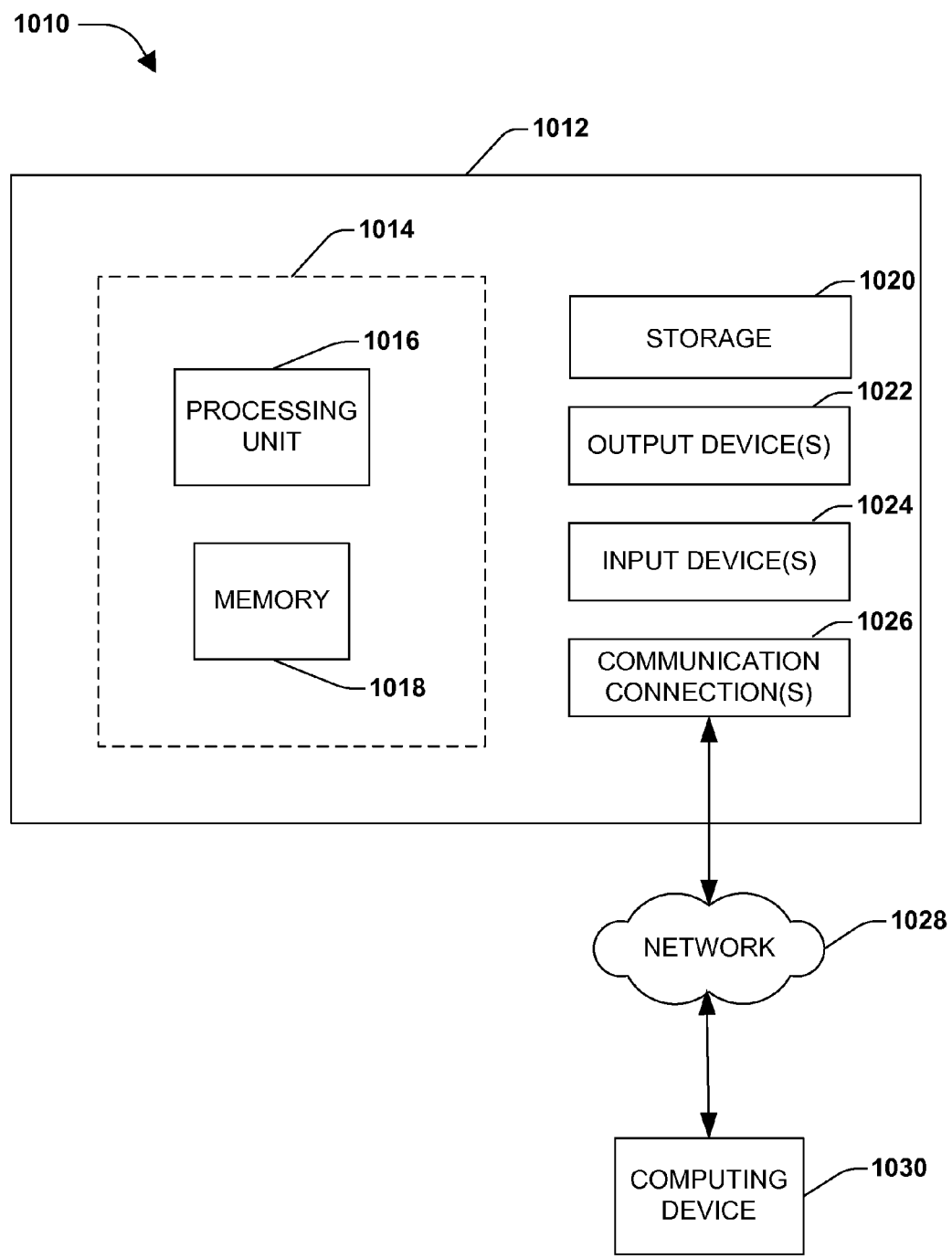
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Also, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method performed by a key service provider connected to a first machine and a second machine, comprising:
    encrypting a key blob using a cryptographic encryption key corresponding to a trusted execution environment on the first machine corresponding to a client to create an encrypted key blob, the cryptographic encryption key corresponding to a cryptographic decryption key accessible to the trusted execution environment, the trusted execution environment being at least partially implemented as hardware in the first machine and being configured to provide for confidential and secure creation of client keys in the first machine;
    wrapping the encrypted key blob with a platform policy corresponding to a platform boot state of the first machine;
    provisioning the encrypted key blob to the client at the first machine after the wrapping;
    receiving a request to re-wrap the encrypted key blob based upon a second trusted execution environment of the second machine, the second trusted execution environment being at least partially implemented as hardware in the second machine and being configured to provide for confidential and secure creation of client keys in the second machine; and
    encrypting the key blob with a second cryptographic encryption key corresponding to the second trusted execution environment on the second machine to create a re-wrapped encrypted key blob, said encrypting comprising wrapping the re-wrapped encrypted key blob with a second platform policy corresponding to a second platform boot state of the second machine.

2. The method of claim 1, comprising:
    wrapping the encrypted key blob with at least one of a key usage number policy or a time window policy.

3. The method of claim 1, comprising:
    wrapping the encrypted key blob with a password policy corresponding to the client.

4. The method of claim 1, comprising:
    receiving a request to re-wrap the encrypted key blob based upon a new platform boot state of the first machine;
    upon determining that the new platform boot state is in a valid state, re-wrapping the encrypted key blob with a new platform policy corresponding to the new platform boot state of the first machine to create a re-wrapped encrypted key blob; and
    provisioning the re-wrapped encrypted key blob to the client at the first machine.

5. The method of claim 1, comprising:
    provisioning the re-wrapped encrypted key blob to the client at the second machine.

6. The method of claim 1, comprising:
    receiving a request to re-wrap the encrypted key blob based upon a new password of the client;

upon validating the new password, re-wrapping the encrypted key blob with the new password to create a re-wrapped encrypted key blob; and provisioning the re-wrapped encrypted key blob to the client.

7. The method of claim 1, comprising:

receiving a request to re-wrap the encrypted key blob based upon a new platform boot state of the first machine; and upon determining that the new platform boot state indicates that the first machine is not in a valid state, refusing to re-wrap the encrypted key blob.

8. The method of claim 1, comprising:

receiving an endorsement key certificate corresponding to the trusted execution environment;

providing an encrypted ownership request to the trusted execution environment, the encrypted ownership request encrypted using the endorsement key certificate; and receiving the cryptographic encryption key from the trusted execution environment based upon the encrypted ownership request.

9. The method of claim 1, the provisioning comprising:

provisioning a client certificate to the client at the first machine after the wrapping, the client certificate indicating client usage compliance.

10. A computer-readable storage device comprising instructions, which, when executed by a key service provider connected to a first machine and a second machine perform operations comprising:

encrypting a key blob using a cryptographic encryption key corresponding to a trusted execution environment on the first machine corresponding to a client to create an encrypted key blob, the cryptographic encryption key corresponding to a cryptographic decryption key accessible to the trusted execution environment, the trusted execution environment being at least partially implemented as hardware in the first machine and being configured to provide for confidential and secure creation of client keys in the first machine;

wrapping the encrypted key blob with a platform policy corresponding to a platform boot state of the first machine;

provisioning the encrypted key blob to the client at the first machine after the wrapping;

receiving a request to re-wrap the encrypted key blob based upon a second trusted execution environment of the second machine, the second trusted execution environment being at least partially implemented as hardware in the second machine and being configured to provide for confidential and secure creation of client keys in the second machine; and encrypting the key blob with a second cryptographic encryption key corresponding to the second trusted execution environment on the second machine to create a re-wrapped encrypted key blob, said encrypting comprising wrapping the re-wrapped encrypted key blob with a second platform policy corresponding to a second platform boot state of the second machine.

11. The computer-readable storage device of claim 10, wherein the trusted execution environment on the first machine is configured to validate the encrypted key blob to enable the first machine to perform a key action.

12. The computer-readable storage device of claim 10, the encrypted key blob wrapped with at least one of a key usage number policy or a time window policy.

13. The computer-readable storage device of claim 10, the encrypted key blob wrapped with a password policy corresponding to the client, a key action request comprising a user password, and a key action corresponding to the key action request being performed based upon the trusted execution environment validating the user password with the password policy.

14. The computer-readable storage device of claim 11, wherein the key action comprises signing an object with a client signature to create a signed object.

15. The computer readable storage device of claim 10, the operations further comprising:

provisioning the re-wrapped encrypted key blob to the client at the second machine.

16. The computer readable storage device of claim 10, the operations further comprising:

receiving a request to re-wrap the encrypted key blob based upon a new platform boot state of the first machine; and upon determining that the new platform boot state indicates that the first machine is not in a valid state, refusing to re-wrap the encrypted key blob.

17. A key service provider connected to a first machine and a second machine, comprising:

one or more processing units; and memory comprising instructions that when executed by at least one of the one or more processing units, implement at least some of:

a provisioning component configured to:

encrypt a key blob using a cryptographic encryption key corresponding to a trusted execution environment on a first machine corresponding to a client to create an encrypted key blob, the cryptographic encryption key corresponding to a cryptographic decryption key accessible to the trusted execution environment, the trusted execution environment being at least partially implemented as hardware in the first machine and being configured to provide for confidential and secure creation of client keys in the first machine;

wrap the encrypted key blob with a platform policy corresponding to a platform boot state of the first machine;

provision the encrypted key blob to the client at the first machine after the wrapping;

receive a request to re-wrap the encrypted key blob based upon a second trusted execution environment of a second machine, the second trusted execution environment being at least partially implemented as hardware in the second machine and being configured to provide for confidential and secure creation of client keys in the second machine; and upon determining that a second platform boot state indicates that the second machine is in a valid state, encrypt the key blob with a second cryptographic encryption key corresponding to the second trusted execution environment on the second machine to create a re-wrapped encrypted key blob and wrap the re-wrapped encrypted key blob with a second platform policy corresponding to the second platform boot state of the second machine.

18. The key service provider of claim 17, the provisioning component further configured to wrap the encrypted key blob with a key usage number policy corresponding to a limit on a number of times the encrypted key blob is usable, and a time window policy corresponding to a limit on usage of the encrypted key blob to a predetermined time frame.

19. The key service provider of claim 17, the provisioning component configured to:
provision the re-wrapped encrypted key blob to the client at the second machine.

20. The key service provider of claim 17, the provisioning component configured to:
wrap the encrypted key blob with a password policy corresponding to the client.

* * * * *